(12) United States Patent
Singh (10) Patent No.: US 11,995,601 B2
(45) Date of Patent: May 28, 2024

(54) DELIVERY ATTEMPT TRACKING USING AUTOMATED VIDEO

(71) Applicant: Johnson Controls Tyco IP Holdings LLP, Milwaukee, WI (US)

(72) Inventor: Sanjeev Singh, Johns Creek, GA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 242 days.

(21) Appl. No.: 17/498,462

(22) Filed: Oct. 11, 2021

(65) Prior Publication Data

US 2023/0115704 A1 Apr. 13, 2023

(51) Int. Cl.
| | |
|---|---|
| G06Q 10/0833 | (2023.01) |
| B60R 11/04 | (2006.01) |
| G06T 5/70 | (2024.01) |
| G06V 20/40 | (2022.01) |
| G06V 20/56 | (2022.01) |
| G06V 40/10 | (2022.01) |
| G06V 40/20 | (2022.01) |
| B60R 11/00 | (2006.01) |

(52) U.S. Cl.
CPC .......... *G06Q 10/0833* (2013.01); *B60R 11/04* (2013.01); *G06T 5/70* (2024.01); *G06V 20/46* (2022.01); *G06V 20/56* (2022.01); *G06V 40/10* (2022.01); *G06V 40/20* (2022.01); *B60R 2011/004* (2013.01); *B60R 2300/105* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 10,474,980 B1 * | 11/2019 | McCalib, Jr. ............ | E05B 19/26 |
| 2015/0310381 A1 * | 10/2015 | Lyman .................. | G06Q 10/083 |
| | | | 705/330 |
| 2018/0181909 A1 * | 6/2018 | Wilkinson .......... | G06F 16/7867 |
| 2020/0349786 A1 * | 11/2020 | Ho ........................ | G06V 40/172 |
| 2021/0174301 A1 * | 6/2021 | Abeywardena ...... | G05D 1/0676 |
| 2022/0083964 A1 * | 3/2022 | Silverstein ......... | G06Q 30/0282 |

FOREIGN PATENT DOCUMENTS

KR 102365430 B1 * 5/2021 ........... G06Q 10/083

OTHER PUBLICATIONS

Vice.com, "Amazon's AI Cameras Are Punishing Drivers for Mistakes They Didn't Make", available at: https://www.vice.com/en/article/88npjv/amazons-ai-cameras-are-punishing-drivers-for-mistakes-they-didnt-make; last accessed Jan. 3, 2024 (Year: 2021).*

* cited by examiner

*Primary Examiner* — Emmett K. Walsh
(74) *Attorney, Agent, or Firm* — ArentFox Schiff LLP (57) ABSTRACT

Apparatus and methods for recording package delivery includes automatically activating, at a delivery location associated with a package, a plurality of image capture devices mounted at a delivery vehicle, in response to receiving a package scan information at the delivery location. A recording of a package delivery attempt recorded by one or more of the plurality of image capture devices is received. A determination is made, based on the recording, whether the package delivery attempt has been completed. In response to determining that the package delivery attempt has been completed, a file including the recording of the package delivery attempt is generated. A notification is sent to a package sender. The notification includes access to the file.

20 Claims, 4 Drawing Sheets

DELIVERY ATTEMPT TRACKING USING AUTOMATED VIDEO

TECHNICAL FIELD

The present disclosure generally relates to vision or imaging systems for vehicles, and more specifically, to delivery attempt tracking using automated video.

BACKGROUND

The growth of electronic commerce has enabled consumers to conduct a large percentage of their shopping online, resulting in a large volume of packages being delivered to homes and businesses. In addition, online shopping is just one of many activities that are causing expansions within the delivery industry, and shipments are often associated with considerable amounts of data, including the identification of the sender, the recipient, the courier (which may be the same entity as the sender), the package contents, and the times of both collection and delivery of the package.

Often, however, packages are collected and delivered when the sender and recipient, respectively, are not present. This presents a particular challenge for packages that require special handling, which can be costly for all constituents in the supply chain. Food or other perishable items, for example, may spoil if left exposed to outside temperatures or if collection is delayed due to the inability of the courier to access the package. Risks are also added when the contents of the package are more expensive. In addition, packages left for delivery or pickup on a doorstep or other location outside of a residence are vulnerable to theft and other risks, such as damage from weather. Redelivery is also a significant problem for couriers and can provide convenience issues for the customer. Accordingly, high value packages may require special handling for security or require insurance against loss or theft. As an example, a sender of a package may require a signature of the recipient before delivery is permitted. The signature requirement may complicate shipment logistics and also may add a delay to the delivery process when the recipient is unavailable to receive the shipment from the courier, which can often result in multiple redelivery attempts and involving additional costs.

Furthermore, thefts may also occur where a delivery service personnel (e.g., a deliveryman) may allege that a package was delivered to a residence, but when in fact, the delivery service personnel may have delivered the package to an accomplice's home instead. Furthermore, even the home owners may potentially be thieves. For example, a home owner finding a package being left at the door may then complain to the retailer or vendor that the package never arrived. Such thefts quickly amount to a very large monetary loss to the retailers or vendors, insurance companies and/or product delivery service companies. Therefore, requiring delivery personnel to take pictures, once the delivery truck reaches recipient's location, or relying on homeowner camera videos are not sufficiently secure solutions. Other ways for customers to obtain products may include, but are not limited to, safe lockers and digital keys to customers' homes and/or garages. However, these approaches often involve privacy, cost and convenience issues.

For these and other reasons, current package collection and delivery methods are inconvenient despite the amount of information available to predict collection and delivery times. Projected collection and delivery times provided by couriers are often mere estimates and do not alleviate the inability to be physically present for the collections and deliveries. As such, a solution is needed for the collection and delivery of packages to occur safely, securely and with certainty whether or not anyone is being present at the property.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to a delivery vehicle equipped with a plurality of cameras configured to automatically trigger video and corresponding meta data collection when delivery personnel attempts delivery at the front door of the recipient's address. The video and meta data can enable automated sharing of delivery proof to the recipient and avoid manual work required for the proof of delivery.

One example implementation relates to a system and/or method for recording package delivery. One aspect of the system and/or method includes automatically activating, at a delivery location associated with a package, a plurality of image capture devices mounted at a delivery vehicle, in response to receiving a package scan information at the delivery location. A recording of a package delivery attempt recorded by one or more of the plurality of image capture devices is received. A determination is made, based on the recording, whether the package delivery attempt has been completed. In response to determining that the package delivery attempt has been completed, a file including the recording of the package delivery attempt is generated. A notification is sent to a package sender. The notification includes access to the file.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The present disclosure relates generally to automated documenting of package delivery attempts, and more particularly to ensuring the secure delivery of a package and the ability to verify that the secure delivery of the package has occurred. As discussed above, delivery practices where packages left at the door of residences are providing thieves with opportunities to steal packages at great loss to the retailers or vendors, insurance companies and/or product delivery service companies.

This disclosure relates to systems, devices, and methods for generating, managing, processing and storing video files of package delivery attempts. In one aspect, the system preferably includes an Artificial Intelligence ("AI") component that controls and adjusts tracking of delivery personnel to keep him/her in sight while making delivery attempt recording. Advantageously, this approach is cost-effective and reliable, as compared to alternatives.

Figure 1:
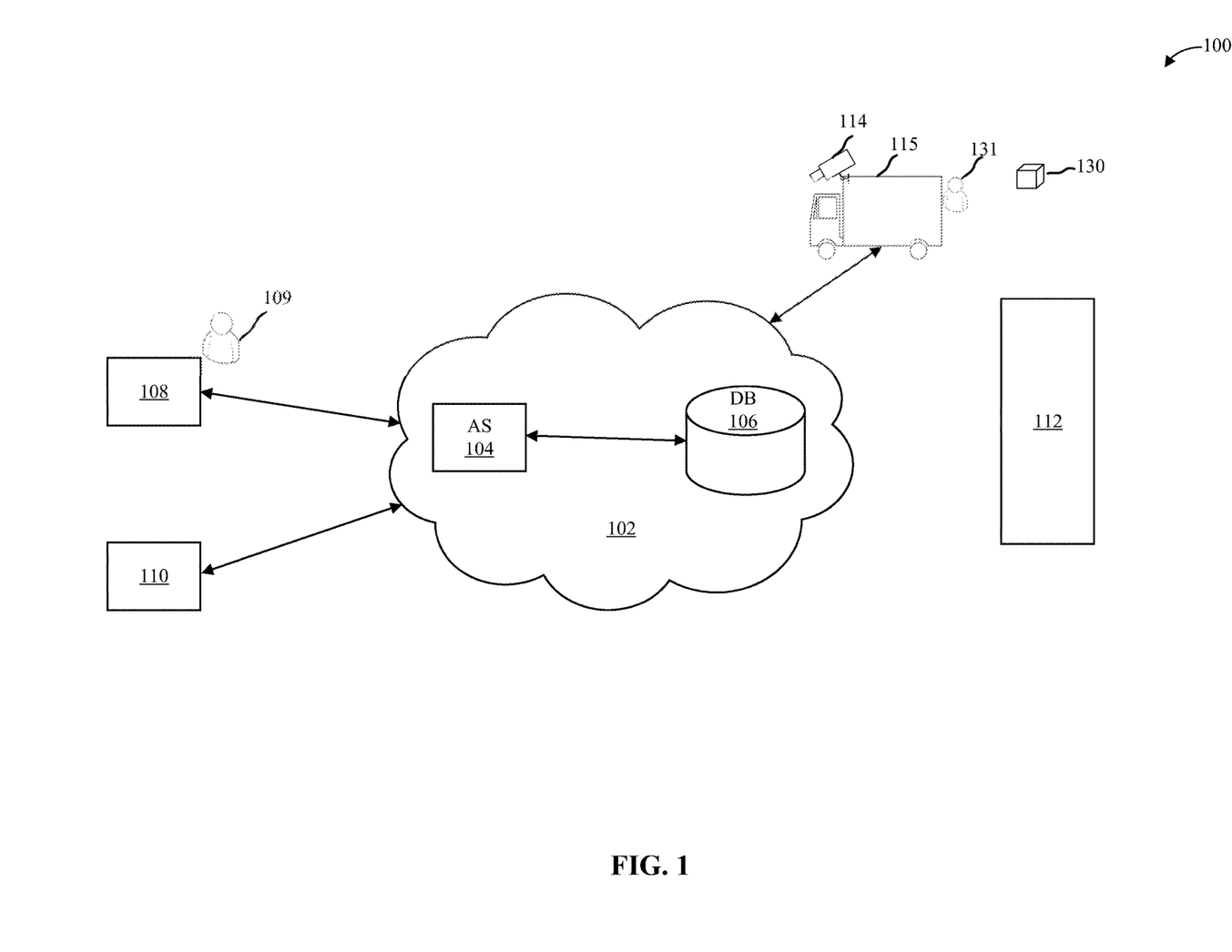
FIG. 1 illustrates an exemplary system showing interaction of components for implementation of delivery tracking system as described in the present disclosure.

FIG. 1 illustrates an exemplary system 100 showing interaction of components for implementation of delivery tracking system as described in the present disclosure. In one aspect, the system 100 may include a cloud-based Video Management System (VMS) 102. In one aspect, the VMS 102 may be an Internet Protocol (IP) based communication network operated by a service provider. However, it should be noted that any type of core networks and/or access networks are within the scope of the present invention, e.g., cellular networks, wireless networks such as Wi-Fi networks, cable networks, optical networks, local area networks, and the like.

The VMS 102 may include an operating system, a database, a controller, a camera interface, memory, and a user device interface. The controller accesses and controls the operating system and the database. In examples, the controller is a central processing unit (CPU) or a microcontroller.

In one aspect, the VMS 102 may include an application server (AS) 104 and a database (DB) 106 configured to perform and/or manage the automated package delivery attempt documentation functionality described herein. In one aspect, the AS 104 may be deployed as a dedicated computer illustrated in FIG. 4 and described below and may perform the operations discussed herein.

In one aspect, the database 106 may store various information disclosed herein. For example, the database 106 may store data associated with customers or subscribers of the network service provider of the VMS 102. For example, the database 106 may store preferences or profiles of subscribers of various services provided by the network service provider of the VMS 102. In one aspect, the network service provider may provide a delivery notification service to a subscriber and the preferences or profiles of subscribers may entail how the packages will be received at the subscribers' residence, how the subscribers will be notified when a package is delivered, and so on.

In one aspect, a subscriber may purchase a product (e.g., online or via a physical store) from a retailer, merchant or vendor where the product will be delivered as a package to the residence of the subscriber or another recipient. In one example, the network service provider may monitor the delivery of the package to the shipping location and, in turn, may provide a notification to the subscriber when the package has been securely delivered. As such, the delivery notification service can be an additional service that is a component of a product delivery service provided by the network service provider.

Although FIG. 1 illustrates the VMS 102 only having a single AS 104 and a single database 106, it should be noted that any number of application servers and databases may be deployed. In addition, it should be noted that VMS 102 may include additional network elements not shown, such as for example, border elements, gateways, routers, switches, firewalls, one or more access networks, and the like.

In one aspect, one or more retailers, merchants or vendors (herein referred generically as a retailer) 110 having hardware systems, e.g., one or more application servers for taking online orders, are in communication with the VMS 102. In one aspect, the retailer may have multiple different locations, e.g., an online presence and/or one or more physical stores. Although a single retailer 110 is illustrated in FIG. 1, it should be noted that any number of retailers may be deployed.

In one aspect, the retailer 110 may be an entity that sells a product to customers, e.g., a subscriber of a network service provider of the VMS 102. However, the customers may also include individuals who are not subscribers of the network service provider of the VMS 102.

FIG. 1 illustrates a customer 109 who utilizes a client device 108 to access the VMS 102 to perform various functions. The client device 108 can be a wired device, e.g., a desktop computer, or a mobile device, e.g., a cellular telephone, a smart phone, a tablet computing device, a laptop computer, a pair of computing glasses, a wireless enabled wristwatch, or any other wireless-capable mobile telephony and computing device. In one aspect, the customer 109 utilizes the client device 108 to make a purchase with a retailer, thereby causing the delivery of a package to the delivery location 112. In one non-limiting example, the delivery location 112 may be a geographic location corresponding to a delivery address, such as a customer's residence. In another aspect, the customer 109 utilizes the client device 108 to receive a notification that the delivery of the package is pending and/or has occurred. In some cases, the delivery location 112 may comprise a much larger housing complex, e.g., an apartment building or a university residence hall, for example.

FIG. 1 also illustrates a delivery vehicle 115 and a package 130 delivered by a delivery person 131. In one aspect, the delivery vehicle 115 employs a hardware processor or a controller and one or more input and/or output devices. The input/output devices may comprise one or more fixed and/or movably positionable image capture devices 114 (e.g., a camera, a sensor, a video camera, a scanner, a bar code scanner, a QR code scanner, and the like), a communication device (e.g., an air card, an Ethernet card, a modem, a transmitter, a receiver and/or a transceiver), a display (e.g., a touch screen display), a memory (e.g., volatile memory or non-volatile memory), a storage device such as a disk drive, a magnetic drive or an optical drive, and/or one or more buttons (e.g., a scan button to trigger a scanner to capture a bar or QR code on the package, and the like). An edge device (shown in FIG. 2) hosted by the delivery vehicle may receive video streams from each respective image capture device 114, and may selectively transmit image data based on the received image streams to the VMS 102, such as by using a communications interface. Additional functions performed by the edge device hosted by the delivery vehicle 115 will be described below in accordance with FIGS. 2 and 3.

Figure 2:
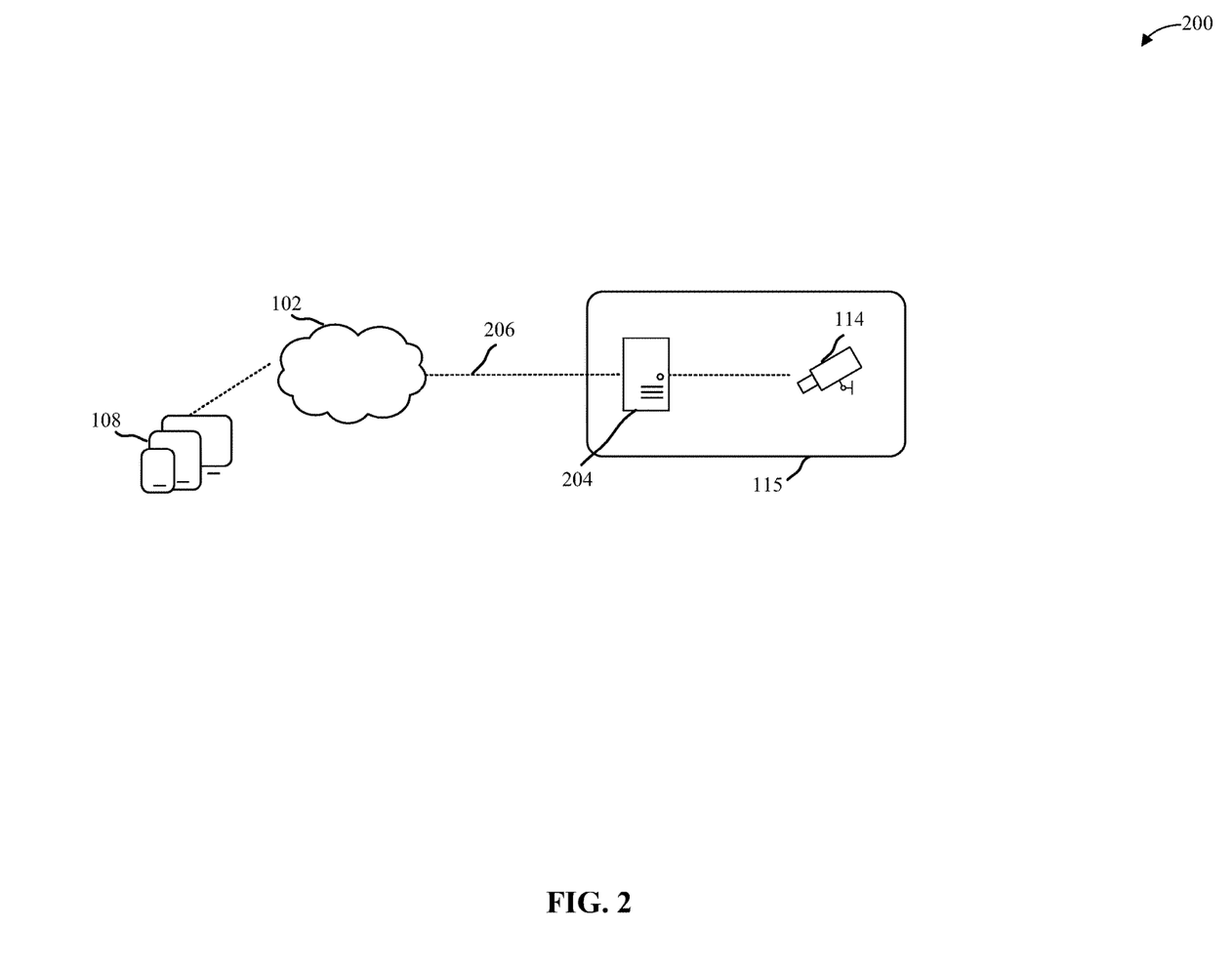
FIG. 2 is an example of a delivery tracking system according to an aspect of the present disclosure.

In more detail, in the illustrated example, multiple image capture devices 114 may be mounted on the delivery vehicle 115, as shown in FIG. 2. The image capture devices may be configured to record the delivery of the package 130 by the delivery person 131. Each image capture device may have a different view of the delivery location 112, via field of view of image capture devices, respectively. The image capture devices 114 provide image data back to the VMS 102.

FIG. 2 is an example of a delivery tracking system 200 according to an aspect of the present disclosure. FIG. 2 shows the delivery vehicle 115 at a delivery location 112. Image capture device 114, which may have a fixed field of view or which may be a camera having a controllable pan, tilt, and/or zoom to have a variable field of view, may be positioned along one or multiple sides of delivery vehicle 115. For example, one or more image capture devices 114 may be positioned along either or both left and right sides, and/or at the rear of the vehicle and directed rearwardly and/or sidewardly from the vehicle, and/or at the front of the vehicle and directed frontwardly and/or sidewardly, to capture an image in one or more directions relative to the vehicle. Alternatively or additionally, one or more image capture devices 114 may be positioned at the roof of delivery vehicle 115 and may be configured to pan, tilt, and/or zoom, and/or to be extended upwards relative to a secured position on top of or within deliver vehicle 115, so as to be oriented to capture a delivery scene.

Each image capture device 114 includes an image sensor, which can detect an image, such as a delivery person 131, a package 130, a delivery location 112, or any combination thereof. Each image capture device 114 may include software and/or hardware configured to identify and track an object, such as the delivery person 131, the package 130, the delivery location 112, or any combination thereof. The image capture device 114 can generate an output signal including one or more frames of the detected images, and transmit the output signal to a remote destination. For example, the image capture device 114 can transmit the output signal to an edge device 204 having a video recorder using a wired or wireless communication protocol. Such edge devices 204 may include, but are not limited to: a Network Video Recorder (NVR), an Artificial Intelligence (AI) appliance having hardware and software configured to execute AI-based software logic, or any other edge gateway or Internet Protocol (IP) gateway device having a storage and processor that functions as a conduit between a cloud server and the image capture device 114.

The output signal can include a plurality of images, which the image capture device 114 may arrange as an image stream (e.g., video stream). The image capture device 114 can generate the output signal (e.g., network packets thereof) to provide an image stream including a plurality of image frames arranged sequentially by time. Each image frame can include a plurality of pixels indicating brightness and color information. In some aspects, the image capture device 114 assigns an indication of time (e.g., time stamp) to each image of the output signal. In some aspects, the image sensor of the image capture device 114 captures an image based on a time-based condition, such as a frame rate or shutter speed.

In some aspects, the image sensor of the image capture device 114 may detect an image responsive to a trigger condition. In some aspects, the trigger condition may include receiving a package scan information, determining that the delivery vehicle stopped at the delivery location 112, determining that the delivery vehicle is within a predefined distance from the delivery location 112. In one example, the trigger condition may be a command signal to capture an image (e.g., based on an input received from the delivery person 131).

The trigger condition may be associated with motion detection. For example, the image capture device 114 can include a proximity sensor, such that the image capture device 114 can cause the image sensor to detect an image responsive to the proximity sensor outputting an indication of motion. The proximity sensor can include sensor(s) including but not limited to infrared, microwave, ultrasonic, or tomographic sensors.

Each image capture device 114 can define a field of view, representative of a spatial region from which light is received and based on which the image capture device 114 generates each image. In some aspects, the image capture device 114 has a fixed field of view. In some aspects, the image capture device 114 can modify the field of view, such as by being configured to pan, tilt, and/or zoom.

The plurality of image capture devices 114 can be positioned in various locations, such as various locations on the delivery vehicle 115. In one example, a right side-viewing camera may be mounted at a right-side portion of the delivery vehicle 115 and having at least a right side field of view relative to the delivery vehicle and a left side-viewing camera mounted at a left-side portion of the delivery vehicle 115 and having at least a left side field of view relative to the delivery vehicle 115. In another example, in addition to the right-side viewing camera and the left-side viewing camera, a forward-viewing camera may be mounted at a front portion of the delivery vehicle 115 and having a forward field of view relative to the delivery vehicle 115 and a backward-viewing camera may be mounted at a rear portion of the delivery vehicle 115 and having a backward field of view relative to the delivery vehicle 115. In some aspects, at least two image capture devices 114 have an at least partially overlapping field of view; for example, two image capture devices 114 may be spaced from one another and oriented to have a same point in their respective fields of view.

The edge device 204 receives an image stream (e.g., video stream) from each respective image capture device 114, such as by using a communications interface. In some aspects, the edge device 204 is a local device located in proximity to the plurality of image capture devices 114, such as in the same delivery vehicle 115 as the plurality of image capture devices 114.

The edge device 204 can use the communications device to selectively transmit image data based on the received image streams to the VMS 102 e.g., via network 206. The communications device of the edge device 204 can be a gateway device. The communications interface (and/or the communications device and/or the communications interface of VMS 102) can include wired or wireless interfaces (e.g., jacks, antennas, transmitters, receivers, transceivers, wire terminals, etc.) for conducting data communications with various systems, devices, or networks. For example, the communications interface may include an Ethernet card and/or port for sending and receiving data via an Ethernet-based communications network (e.g., network 206). In some aspects, the communications interface includes a wireless transceiver (e.g., a WiFi transceiver, a Bluetooth transceiver, a NFC transceiver, ZigBee, etc.) for communicating via a wireless communications network (e.g., network 206). The communications interface may be configured to communicate via network 206, which may be associated with wide area networks (e.g., the Internet, a cellular network, a radio communication network, etc.) and may use a variety of communications protocols (e.g., BACnet, TCP/IP, point-to-point, etc.).

In an aspect, the processing circuit of the edge device 204 may be configured to switch the recording from one image capture device 114 to another, when, for example, the delivery person 131 leaves the field of view of that particular image capture device 114. For example, optionally, the delivery person 131 can be selectively illuminated (if recording at night) and/or selectively recorded only when the delivery person 131 is in full view of that particular image capture device 114 to reduce data flow from the plurality of the image capture devices 114.

In certain exemplary aspects, the processing circuit of the edge device 204 may be configured to control the point/tilt/zoom (PTZ) function of these image capture devices 114. The tracking of the delivery person 131 may be performed by the edge device 204 by analyzing the incoming video stream to ensure good recording of the delivery attempt. Once the delivery person 131 is located in a field of view of at least one image capture device 114, the processing circuit of the edge device 204 can send point/tilt/zoom commands to the appropriate image capture device 114 based on movement of the delivery person 131, based on delivery location 112, and the like. In other words, video recording can transfer from one image capture device 114 to another if the field of view where the delivery person 131 is located changes. In certain exemplary aspects, the processing circuit of the edge device 204 and/or the VMS 102 may be configured to selectively combine multiple video streams based on movement of delivery person 131 and/or package 130 from the field of view of one image capture device 114 to another.

In an aspect, the processing circuit of the edge device 204 may be configured to apply effects of augmented reality to the video recording. Effects of augmented reality of the video may be to use soft focus (e.g. soft focus lens), blurring and color tinting, horizontal blur (e.g., top and bottom are blurred). Other video effects that may be applied may include: motion blurs and trails, adjust contrast for the video to be crisp, and enhancing lines. In addition, audio effects can also be enhanced by the edge device 204. Audio effects such as band pass filter sound, conversations around delivery person 131 can be scrambled. Alternatively, if the processing circuit of the edge device 204 determines that a package recipient is at home, the edge device 204 may apply audio effects to tune into a conversation between the delivery person 131 and the package recipient by beam forming, learning voice model, and then scramble other noise in environment.

In an aspect, the processing circuit of the edge device 204, may also be configured to detect completion of the delivery attempt. In one non-limiting example, determining that the package delivery attempt has been completed by the edge device 204 may include detecting movement, by at least one of the plurality of sensors of image capture device 114, of the delivery person 131 from the delivery location 112 towards the delivery vehicle 115. In certain exemplary aspects, the processing circuit of the edge device 204 may communicate, via a wireless communication link, with a mobile device of the delivery person 131. Such mobile device may receive an input (acknowledgment of delivery) from the delivery person 131. In some aspects, such input can be the indication of completion of delivery. At least in some cases, the processing circuit of the edge device 204 may also confirm that the package 130 was delivered to a correct address based on a visual content of the recorded video file.

The processing circuit of the edge device 204 can selectively store image frame(s) of the image streams from the plurality of image capture devices 114 in a local image database of the memory based on a storage policy. The storage policy may include a rule such as to store image frame(s) from an image stream based on a sample rate (e.g., store n images out of every consecutive m images; store j images every k seconds).

In some aspects, the storage policy includes a rule to store image frame(s) based on a status of the image frame(s). For example, the status may indicate the image frame(s) were captured based on detecting delivery of the package, such that the processing circuit of the edge device 204 stores image frame(s) that were captured based on detecting delivery.

The processing circuit of the edge device 204 can assign, to each image frame stored in the local image database, an indication of a source of the image frame. The indication of a source may include an identifier of the image capture device 114 from which the image frame was received, as well as a location identifier (e.g., delivery location 112).

As discussed above, the VMS 102 may maintain many or all image frame(s) received from the image capture devices 114 in the database 106. The VMS 102 may maintain, in the database 106, mappings of image frame(s) to other information, such as identifiers of image sources, identifiers of delivery location 112 or other entities.

In an aspect, the edge device 204 may provide delivery completion information to the VMS 102, which may include the recording and other information describing the delivery of the package 130 to the location of the package recipient (e.g., delivery location 112). In some aspects, this delivery completion information (including video) may be used by the VMS 102 to form a notification to the client device 108 indicating, for example, that the delivery vehicle 115, and therefore the delivery person 131, is proximate to the location to which the package 130 is to be delivered (e.g., delivery location 112). In further aspects, this delivery completion information may be used by the VMS 102 to form a notification to the client device 108 indicating that the customer 109 utilizing the client device 108 (e.g., package sender) may view information recorded by the plurality of the image capture devices 114 installed on the delivery vehicle 115 and provided by the edge device 204 which shows the package 130 being placed at the delivery location 112 by the delivery person 131.

Figure 3:
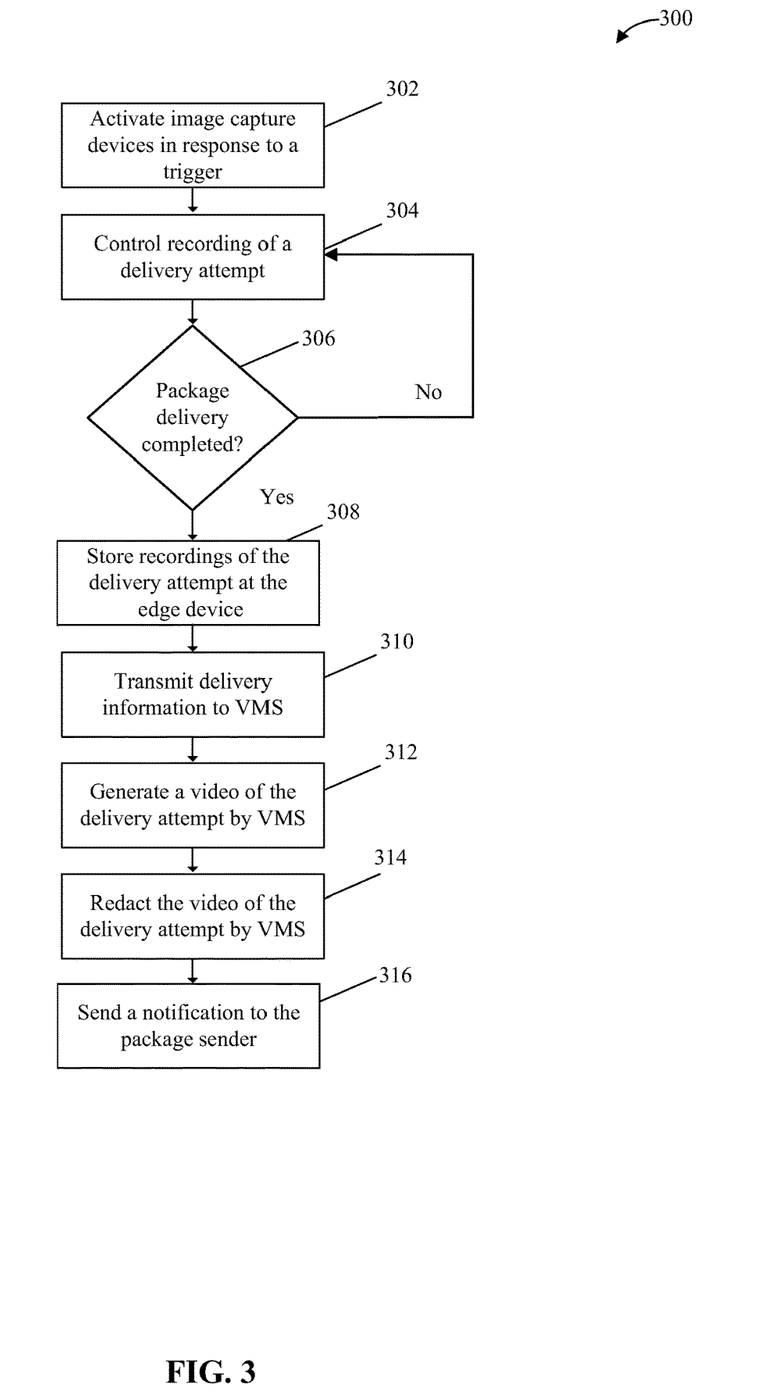
FIG. 3 is an example of a flow diagram of a method for recording package delivery according to an aspect of the present disclosure.

Referring to FIG. 3, an example of a flow diagram of a method for recording package delivery according to an aspect of the present disclosure. FIGS. 1 and 2 may be referenced in combination with the flowchart of FIG. 3. To start, method 300 may be performed by a processing circuit of the edge device 204 and may utilize one or more image capture devices 114 mounted on a delivery vehicle 115, as described above.

At step 302, the processing circuit of the edge device 204 can activate one or more of the plurality of image capture devices 114, in response to an activation trigger. The activation trigger may include, but is not limited to receiving a package scan information, determining that the delivery vehicle 115 stopped at the delivery location 112, determining that the delivery vehicle 115 is within a predefined distance from the delivery location. In some aspects, the scan information may include at least address of a package recipient and an identifier of an account associated with the package recipient.

At step 304, the processing circuit of the edge device 204 may start coordinating the recording of the delivery attempt. In an aspect, the processing circuit of the edge device 204 may be configured to control PTZ function of the image capture devices 114. The processing circuit of the edge device 204 may be configured to switch the recording from one image capture device 114 to another, when, for example, the delivery person 131 leaves the field of view of that particular image capture device 114. In an aspect, the tracking of the delivery person 131 may be performed by the edge device 204 by analyzing the incoming video stream(s) to ensure good recording of the delivery attempt. In an aspect, the processing circuit of the edge device 204 may be configured to utilize a machine learning algorithm. In one non-limiting example, the delivery person 131 can be selectively illuminated (if recording at night) and/or selectively recorded only when the delivery person 131 is in full view of that particular image capture device 114 to reduce data flow from the plurality of the image capture devices 114.

At step 306, as part of the delivery attempt recording phase, the edge device 204 may determine whether the delivery attempt has been completed. In an aspect, determining that the package delivery attempt has been completed by the edge device 204 may include detecting movement, by at least one of the plurality of sensors of image capture device 114, of the delivery person 131 from the delivery location 112 towards the delivery vehicle 115. In an aspect, the processing circuit of the edge device 204 may also confirm that the package 130 was delivered to a correct address based on a visual content of the recorded video file. In one implementation, in response to determining that the package 130 was delivered to a wrong address/delivery location 112, the edge device 204 may notify the delivery person 131 of a mistake, for example, by generating an audible alert within the delivery vehicle 115. If the delivery attempt has not been completed (or properly completed) yet (decision at 306, No branch), the edge device 204 may return back to step 304.

If the delivery attempt has been completed successfully (decision at 306, Yes branch), the edge device 204 can selectively store image frame(s) of the image streams from the plurality of image capture devices 114 in a local image database of the memory based on a storage policy (at step 308). Each of the video streams in this set will contain a plurality of video frames.

Next, at step 310, the edge device 204 may provide delivery completion information to the VMS 102, which may include the video recording(s) and other information describing the delivery of the package 130 to the location of the package recipient (e.g., delivery location 112). In other words, the edge device 204 may attempt to send video recordings of the delivery attempt made by each of the plurality of the image capture devices 114, assuming there is a reliable connection to the VMS 102. If such multiple recordings are provided to the VMS 102, it may create a single video file by combining recordings from each image capture device 114, as described below.

At step 312, the AS 104 of the VMS 102 may generate at least one video file by combining recordings made by two or more image capture devices 114. In one non-limiting example, by using each processed frame, the AS 104 may create properly time sequenced video evidence of the delivery attempt. In an aspect, the AS 104 may generate a new audio visual data file that where high quality audio content is synchronized with the video content generated by the plurality of image capture devices 114. This step may be performed, for example, based on a predetermined user's preference of digitally combining the audio data and the high-quality video data. The AS 104 may perform additional enhancements, for example, by using augmented reality effects, based on the level of quality selected by the user for the generated audio visual data file of the delivery attempt.

In an aspect, at 314, the AS 104 may perform additional redaction of the generated audio visual data file. For example, the faces of the people can be redacted to ensure privacy of any individuals accidentally recorded in the generated audio visual data file. In alternative implementation, this step may also be performed by the edge device 204 while controlling the recording of a delivery attempt (step 304). For example, the edge device 204 may orient the image capture devices 114 such that it observes a scene of interest, such as the delivery person 131 and a doorway of the delivery location 112. Furthermore, the edge device 204 may detect face-like objects or significant motion of objects, other than the delivery person 131, in the view. For example, if the image capture devices 114 is aimed down at a doorway, people approaching or walking away from that doorway may be detected before they can attain a position where they will be in a full field of view of the image capture device 114 performing the recording. In such a scenario, the scene, or portions of it, such as the faces of the approaching individuals, may be redacted by the edge device 204. In an aspect, the final audio visual data file may be hosted by the database 106. The database 106 may further store a link to the generated/redacted file that can be used to view the recorded video evidence.

In an aspect, at 316, may generate and send a delivery notification to the package sender. The delivery notification may include the place (e.g., delivery location 112) and time of delivery. In aspects, the delivery notification may be in the form of a textual and/or graphical notification, such as an email, text message or instant message, including a link or reference to the audio visual data file providing the recorded evidence of the delivery attempt may be included in the generated delivery notification. Finally, the AS 104 sends the delivery notification to the client device 108 via a wired and/or wireless communication link, allowing the package recipient to later view the audio visual data file. To help ensure privacy, so that only intended recipients can view the link, the link to the audio visual data file may be protected by the AS 104.

In an aspect, the delivery recording infrastructure may be augmented by use of body worn camera that may be attached to the delivery person 131 to ensure that the video can be recorded in dense residential areas where the delivery person 131 may go out of the view of the image capture devices 114 mounted on the delivery vehicle 115. From the point of view of the edge device 204, this additional body worn camera, may be just like any other of the plurality of image capture devices 114 that can be activated as needed. However, in this case the communication between the edge device 204 and the body worn camera will be via wireless means, such as, but not limited to cellular network, Wireless Fidelity (WiFi) network (if in range of the vehicle).

In other words, the method 300 includes a method for recording package delivery. The method includes automatically activating, at a delivery location associated with a package, a plurality of image capture devices mounted at a delivery vehicle, in response to receiving a package scan information at the delivery location. A recording of a package delivery attempt recorded by one or more of the plurality of image capture devices is received. A determination is made, based on the recording, whether the package delivery attempt has been completed. In response to determining that the package delivery attempt has been completed, a file including the recording of the package delivery attempt is generated. A notification is sent to a package sender. The notification includes access to the file.

In one or any combination of these aspects, the plurality of image capture devices include at least: a right side-viewing camera mounted at a right-side portion of the delivery vehicle and having at least a right side field of view relative to the delivery vehicle; and a left side-viewing camera mounted at a left-side portion of the delivery vehicle and having at least a left side field of view relative to the delivery vehicle.

In one or any combination of these aspects, the plurality of image capture devices also include: a forward-viewing camera mounted at a front portion of the delivery vehicle and having a forward field of view relative to the delivery vehicle; and a backward-viewing camera mounted at a rear portion of the delivery vehicle and having a backward field of view relative to the delivery vehicle.

In one or any combination of these aspects, the method further includes issuing one or more commands associated with the recording of the delivery attempt to at least one of the plurality of image capture devices based on a determined location of a delivery person within the field of view of each image capture device.

In one or any combination of these aspects, determining that the package delivery attempt has been completed comprises detecting movement, by at least one of the plurality of image capture devices, of a delivery person from the delivery location towards the delivery vehicle.

In one or any combination of these aspects, generating the file comprises appending together at least a first set of frames of a first video stream recorded by a first one of the plurality of image capture devices, and at least a second set of frames of a second video stream recorded by a second one of the plurality of image capture devices.

In one or any combination of these aspects, the first set of frames and the second set of frames are associated with a transition of a delivery person making the delivery attempt from a first field of view of the first one of the plurality of image capture devices to a second field of view of the second one of the plurality of image capture devices.

In one or any combination of these aspects, the method further includes storing the file at a memory device associated with the delivery vehicle. Different portions of the file are recorded by two or more of the plurality of image capture devices from different angles.

In one or any combination of these aspects, the method further includes transmitting the file to a cloud server.

In one or any combination of these aspects, the method further includes redacting the file based on a command to redact at least a portion of a visual content of the file.

In one or any combination of these aspects, the command to redact portion of the visual content of the generated file includes a blur command to apply a blur filter to the portion of the visual content of the file.

In one or any combination of these aspects, the method further includes confirming that the package was delivered to a correct address based on a visual content of the file.

In one or any combination of these aspects, the activation trigger includes at least one of: receiving a package scan information, determining that the delivery vehicle stopped at the delivery location, determining that the delivery vehicle is within a predefined distance from the delivery location or a manual input for starting recording by the delivery person.

In one or any combination of these aspects, the scan information includes at least address of a package recipient and an identifier of an account associated with the package recipient.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein.

Figure 4:
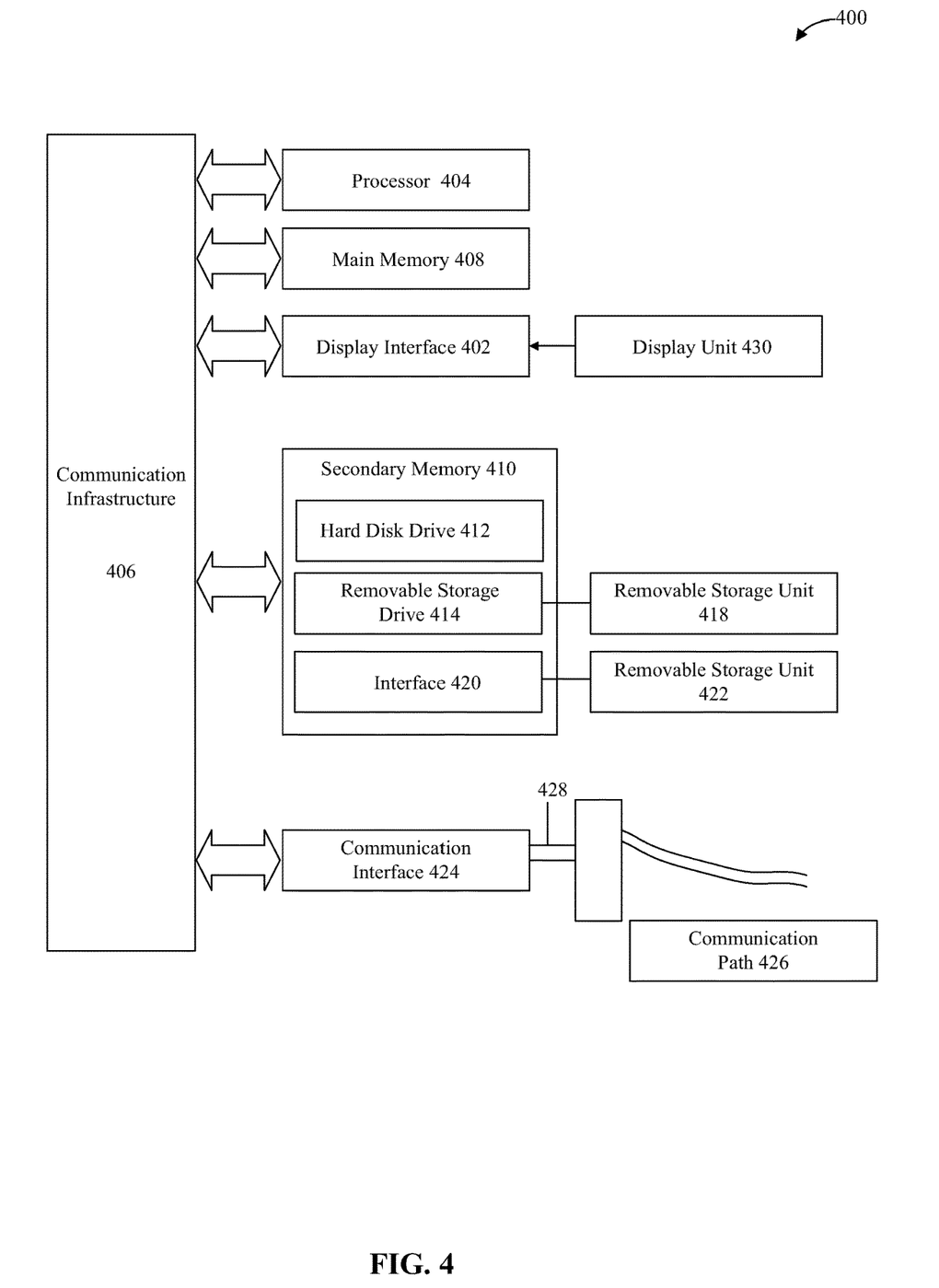
FIG. 4 is a block diagram of various hardware components and other features of a computer system that may operate the delivery tracking system in accordance with aspects of the present disclosure.

FIG. 4 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 404, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 406, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 400, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 414, a hard disk installed in hard disk drive 412, and signals 428. These computer program products provide software to the computer system 400. Aspects of the disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform various features in accordance with aspects of the present disclosure, as discussed herein. In particular, the computer programs, when executed, enable the processor 404 to perform such features. Accordingly, such computer programs represent controllers of the computer system 400.

In variations where aspects of the disclosure are implemented using software, the software may be stored in a computer program product and loaded into computer system 400 using removable storage drive 414, hard drive 412, or communications interface 420. The control logic (software), when executed by the processor 404, causes the processor 404 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for recording package delivery, comprising:
    automatically activating, by a processor, at a delivery location associated with a package, at least two image capture devices mounted at a delivery vehicle, in response to an activation trigger;
    issuing, by the processor, one or more commands associated with recording a package delivery attempt to the at least two image capture devices based on a determined location of a delivery person within a field of view of each one of the at least two image capture devices;
    receiving, by the processor, a recording captured by the at least two image capture devices, of the package delivery attempt;
    determining, by the processor and based on the recording, whether the package delivery attempt has been completed;
    generating, by the processor, a file comprising the recording of the package delivery attempt, in response to determining that the package delivery attempt has been completed; and
    sending, by the processor, a notification to a package sender, wherein the notification includes access to the file.

2. The method of claim 1, wherein the at least two image capture devices comprise at least:
    a right side-viewing camera mounted at a right-side portion of the delivery vehicle and having at least a right side field of view relative to the delivery vehicle; and
    a left side-viewing camera mounted at a left-side portion of the delivery vehicle and having at least a left side field of view relative to the delivery vehicle.

3. The method of claim 2, wherein the at least two image capture devices further comprise:
a forward-viewing camera mounted at a front portion of the delivery vehicle and having a forward field of view relative to the delivery vehicle; and
a backward-viewing camera mounted at a rear portion of the delivery vehicle and having a backward field of view relative to the delivery vehicle.

4. The method of claim 1, wherein determining that the package delivery attempt has been completed comprises detecting movement, by at least one of the at least two image capture devices, of the delivery person from the delivery location towards the delivery vehicle.

5. The method of claim 1, wherein generating the file comprises appending together at least a first set of frames of a first video stream recorded by a first one of the at least two image capture devices, and at least a second set of frames of a second video stream recorded by a second one of the at least two image capture devices.

6. The method of claim 5, wherein the first set of frames and the second set of frames are associated with a transition of the delivery person making the package delivery attempt from a first field of view of the first one of the at least two image capture devices to a second field of view of the second one of the at least two image capture devices.

7. The method of claim 1, further comprising storing, by the processor, the file at a memory device associated with the delivery vehicle, wherein different portions of the file are recorded by two or more of the at least two image capture devices from different angles.

8. The method of claim 1, further comprising transmitting, by the processor, the file to a cloud server.

9. The method of claim 1, further comprising redacting the file based on a command to redact at least a portion of a visual content of the file.

10. The method of claim 9, wherein the command to redact the portion of the visual content of the file comprises a blur command to apply a blur filter to the portion of the visual content of the file.

11. The method of claim 1, further comprising confirming that the package was delivered to a correct address based on a visual content of the file.

12. The method of claim 1, wherein the activation trigger comprises at least one of: receiving package scan information, determining that the delivery vehicle stopped at the delivery location, determining that the delivery vehicle is within a predefined distance from the delivery location, and/or a manual input for starting the recording by the delivery person.

13. The method of claim 12, wherein the package scan information includes at least an address of a package recipient and an identifier of an account associated with the package recipient.

14. A system for recording package delivery comprising:
a hardware processor configured to:
automatically activate, at a delivery location associated with a package, at least two image capture devices mounted at a delivery vehicle, in response to an activation trigger;
issue one or more commands associated with recording a package delivery attempt to the at least two image capture devices based on a determined location of a delivery person within a field of view of each one of the at least two image capture devices;
receive a recording captured by the at least two image capture devices, of the package delivery attempt;
determine, based on the recording, whether the package delivery attempt has been completed;
generate a file comprising the recording of the package delivery attempt, in response to determining that the package delivery attempt has been completed; and
send a notification to a package sender, wherein the notification includes access to the file.

15. The system of claim 14, wherein the at least two image capture devices comprise at least:
a right side-viewing camera mounted at a right-side portion of the delivery vehicle and having at least a right side field of view relative to the delivery vehicle; and
a left side-viewing camera mounted at a left-side portion of the delivery vehicle and having at least a left side field of view relative to the delivery vehicle.

16. The system of claim 15, wherein the at least two image capture devices further comprise:
a forward-viewing camera mounted at a front portion of the delivery vehicle and having a forward field of view relative to the delivery vehicle; and
a backward-viewing camera mounted at a rear portion of the delivery vehicle and having a backward field of view relative to the delivery vehicle.

17. The system of claim 14, wherein the hardware processor configured to determine that the package delivery attempt has been completed is further configured to detect movement, by at least one of the at least two image capture devices, of the delivery person from the delivery location towards the delivery vehicle.

18. The system of claim 14, wherein the hardware processor configured to generate the file is further configured to append together at least a first set of frames of a first video stream recorded by a first one of the at least two image capture devices, and at least a second set of frames of a second video stream recorded by a second one of the ene or more at least two image capture devices.

19. A method for recording package delivery, comprising:
automatically activating, by a processor, at a delivery location associated with a package, a controllable image capture device mounted at a delivery vehicle, in response to an activation trigger, wherein the controllable image capture device has a controllable pan, tilt, and/or zoom;
issuing one or more commands associated with recording a package delivery attempt to the controllable image capture device based on a determined location of a delivery person within at least two different fields of view of the controllable image capture device;
receiving, by the processor, a recording captured by the controllable image capture device, of the package delivery attempt;
determining, by the processor and based on the recording, whether the package delivery attempt has been completed;
generating, by the processor, a file comprising the recording of the package delivery attempt, in response to determining that the package delivery attempt has been completed; and
sending, by the processor, a notification to a package sender, wherein the notification includes access to the file.

20. The method of claim 19, wherein determining that the package delivery attempt has been completed comprises detecting movement, by the controllable image capture device, of the delivery person from the delivery location towards the delivery vehicle.

\* \* \* \* \*